(12) United States Patent
Meng et al.

(10) Patent No.: US 12,395,447 B2
(45) Date of Patent: Aug. 19, 2025

(54) MAPPING RELATIONSHIP UPDATING METHOD AND APPARATUS

(71) Applicant: HUAWEI TECHNOLOGIES CO., LTD., Guangdong (CN)

(72) Inventors: Rui Meng, Beijing (CN); Chuang Wang, Beijing (CN); Delei Yu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 522 days.

(21) Appl. No.: 17/749,370

(22) Filed: May 20, 2022

(65) Prior Publication Data

US 2022/0278919 A1    Sep. 1, 2022

Related U.S. Application Data

(63) Continuation of application No. PCT/CN2020/130288, filed on Nov. 20, 2020.

(30) Foreign Application Priority Data

Nov. 21, 2019 (CN) .......................... 201911150993.X

(51) Int. Cl.
  *H04L 47/283* (2022.01)
  *H04L 45/00* (2022.01)
  *H04L 45/02* (2022.01)
(52) U.S. Cl.
  CPC ............ *H04L 47/283* (2013.01); *H04L 45/02* (2013.01); *H04L 45/54* (2013.01)
(58) Field of Classification Search
  None
  See application file for complete search history.

(56) References Cited

U.S. PATENT DOCUMENTS

| | | | |
|---|---|---|---|
| 2007/0280245 A1 | 12/2007 | Rosberg | |
| 2016/0021017 A1* | 1/2016 | Thubert | H04L 47/125 370/235 |
| 2018/0152377 A1 | 5/2018 | Wetterwald et al. | |
| 2019/0097884 A1* | 3/2019 | Thubert | H04L 43/16 |

FOREIGN PATENT DOCUMENTS

| | | |
|---|---|---|
| CN | 109120469 A | 1/2019 |
| CN | 109451080 A | 3/2019 |
| CN | 109768991 A | 5/2019 |
| CN | 110446227 A | 11/2019 |

OTHER PUBLICATIONS

Robert Annessi et al., Encryption is Futile: Delay Attacks on High-Precision Clock Synchronization, arXiv: 1811.08569v1 [cs.CR] Nov. 21, 2018, 15 pages.

* cited by examiner

*Primary Examiner* — Diane L Lo
(74) *Attorney, Agent, or Firm* — WOMBLE BOND DICKINSON (US) LLP

(57) ABSTRACT

This application provides a mapping relationship updating method, applied to deterministic networking. The method includes: A first device sequentially obtains a first packet and a second packet that are sent by a second device; the first device determines a first time difference between a time at which the first packet is received and a time at which the second packet is received; and if the first device determines that the first time difference is not within a preset range, the first device updates a period-based mapping relationship.

17 Claims, 9 Drawing Sheets

| Version | Traffic class | Flow label | |
|---|---|---|---|
| Payload length | | Next header | Hop limit |
| Source address | | | |
| Destination address | | | |

FIG. 5A

| Version | IP header length | Type of service | Total length | |
|---|---|---|---|---|
| Identification | | | Flags | Fragment offset |
| Time to live | | Protocol | Header checksum | |
| Source IPv4 address | | | | |
| Destination IPv4 address | | | | |
| Options | | | | Padding |

FIG. 5B

| Next header | Header extension length | Options |
|---|---|---|

FIG. 5C

| Next header | Header extension length | Routing type | Segment left |
|---|---|---|---|
| Type-specific data ||||

FIG. 5D

| Next header | Header extension length | Routing type | Segment left |
|---|---|---|---|
| Last entry | Flag | TAG ||
| At least one segment address ||||
| Optional TLV ||||

FIG. 5E

| Preamble | Start of frame delimiter | Destination MAC address | Source MAC address | 802.1Q tag (optional) | Ether type | Payload | CRC |
|---|---|---|---|---|---|---|---|

FIG. 5F

| Label | Exp | S | TTL |
|---|---|---|---|

FIG. 5G

MAPPING RELATIONSHIP UPDATING METHOD AND APPARATUS

CROSS-REFERENCE TO RELATED APPLICATIONS

This application is a continuation of International Application No. PCT/CN2020/130288, filed on Nov. 20, 2020, which claims priority to Chinese Patent Application No. 201911150993.X, filed on Nov. 21, 2019. The disclosures of the aforementioned applications are hereby incorporated by reference in their entireties.

TECHNICAL FIELD

This application relates to the communications field, and in particular, to a mapping relationship updating method and an apparatus.

BACKGROUND

Deterministic networking can satisfy bandwidth, delay, and delay variation requirements for end-to-end data transmission. For example, when an upstream node transmits data to a downstream node on a data transmission link, a delay of receiving the data by the downstream node may be known. After receiving the data transmitted by the upstream node, the downstream node forwards the data to a next hop. However, when an abnormal delay occurs on the link between the downstream node and the upstream node, for example, when a link is switched or a link delay changes, the downstream node cannot detect the abnormal delay, resulting in abnormal data transmission of the downstream node. For example, there are a plurality of optical fibers or a plurality of connected ports between the upstream node and the downstream node. When data transmitted by the upstream node is switched to a new link for transmission, the downstream node cannot learn the link switching, thereby affecting data transmission of the downstream node.

SUMMARY

This application provides a mapping relationship updating method, applied to deterministic networking, so as to update a period-based mapping relationship in a timely manner after occurrence of an abnormal delay of a link is determined, thereby ensuring stable packet forwarding.

In view of this, according to a first aspect of this application, a mapping relationship updating method is provided. The mapping relationship updating method includes:

A first device sequentially obtains a first packet and a second packet that are sent by a second device; the first device determines a first time difference between a time at which the first packet is received and a time at which the second packet is received; and if the first device determines that the first time difference is not within a preset range, the first device updates a period-based mapping relationship, where the period-based mapping relationship includes a mapping relationship between a first period label and a sending period, the first period label is an identifier carried in a packet sent by the second device to the first device, and the sending period is a period for the first device to forward the packet corresponding to the first period label to a third device.

In this embodiment of this application, the first device, namely a downstream node, may sequentially obtain the first packet and the second packet that are sent by the second device, namely an upstream node. When the time difference between the time at which the first packet is received and the time at which the second packet is received is not within the preset range, the first device updates the period-based mapping relationship, so that the first device can forward a packet based on the updated period-based mapping relationship, and avoid abnormal data transmission caused by an abnormal link. Even if an abnormal delay occurs between the second device and the first device, the first device can detect the abnormal delay in a timely manner, and update the period-based mapping relationship in a timely manner, thereby improving stability of packet transmission.

According to a second aspect of this application, a link detection method is provided. The link detection method includes: A first device sequentially obtains a first packet and a second packet that are sent by a second device; the first device determines a first time difference between a time at which the first packet is received and a time at which the second packet is received; and if the first device determines that the first time difference is not within a preset range, the first device determines that a link between the first device and the second device has been switched.

Therefore, in this embodiment of this application, when the first time difference between the time at which the first packet is received and the time at which the second packet is received is not within the preset range, the first device may determine that a link between the first device and the second device has been switched. The first device may monitor a transmission status of the link between the first device and the second device, and detect an abnormal link in a timely manner. A mechanism for detecting link switching in a timely manner by the downstream node is provided, so that the first device can detect link switching in a timely manner and recover packet transmission in a timely manner.

In an embodiment, after the first device detects that the link between the first device and the second device has been switched, the method may further include: The first device updates a period-based mapping relationship, where the period-based mapping relationship includes a mapping relationship between a first period label and a sending period, the first period label is an identifier carried in a packet sent by the second device to the first device, and the sending period is a period for the first device to forward the packet corresponding to the first period label to a third device.

In the embodiment of this application, after detecting that the link has been switched, the first device may update the period-based mapping relationship in a timely manner, so that packet transmission can be subsequently performed based on the updated period-based mapping relationship, thereby improving stability of packet transmission.

The following describes some embodiments based on the first aspect or the second aspect.

In an embodiment, that a first device sequentially obtains a first packet and a second packet that are sent by a second device includes: The first device sequentially receives at least two packets that are sent by the second devices; and the first device determines the first packet and the second packet from the at least two packets, where the first packet and the second packet each include a preset identifier.

In the embodiment of this application, the first packet and the second packet may each carry a preset identifier, so that the first device can determine the first packet and the second packet from a plurality of received packets, and further determine, based on the first packet and the second packet, whether the period-based mapping relationship needs to be updated.

In an embodiment, the first packet may be signaling constructed by the second device. For example, when the second device currently receives no packet sent by the upstream node, the second device may construct the first packet, so that the first device can detect, based on the first packet, an abnormal link in a timely manner, and update the period-based mapping relationship in a timely manner.

In an embodiment, the first packet includes a first preset identifier, the second packet includes a second preset identifier, a period for the second device to send the first packet is a first period, and a period for the second device to send the second packet is a second period; and the first preset identifier is used to indicate that the first packet is the 1st packet sent by the second device in the first period, and the second preset identifier is used to indicate that the second packet is the 1st packet sent by the second device in the second period; or the first preset identifier is used to indicate an offset between a time at which the second device sends the first packet and a start time of the first period, and the second preset identifier is used to indicate an offset between a time at which the second device sends the second packet and a start time of the second period.

In the embodiment of this application, the second device may add a preset identifier to the first packet in a sending period, to indicate that the packet is a first packet in the sending period; or may add a preset identifier in any packet in a period, where the identifier is used to indicate an offset between a sending time of the packet and a start time of the period. Therefore, when receiving the first packet and the second packet, the second device may determine, in a timely manner based on the first preset identifier carried in the first packet and the second preset identifier carried in the second packet, whether the period-based mapping relationship needs to be updated, thereby monitoring a link status and improving stability of packet transmission.

In an embodiment, that the first device updates the period-based mapping relationship may include: The first device obtains a receiving time of a third packet, a preset processing duration, and a second period label carried in the third packet, where the second period label is used to indicate a period for the second device to send the third packet; and the first device updates the period-based mapping relationship based on the receiving time, the second period label, and the preset processing duration.

In the embodiment of this application, the first device may update the period-based mapping relationship based on the receiving time of the third packet, the preset processing duration, and the second period label carried in the third packet, and match the first period label carried in a packet sent by the second device with a period for the first device to forward the packet to a third device. Even if an abnormal delay occurs on a link, the first device can update the period-based mapping relationship in a timely manner, so that packets can be subsequently forwarded based on the updated period-based mapping relationship, thereby improving stability of packet transmission.

In an embodiment, the preset processing duration may include: duration from receiving of a first byte to a last byte of the third packet by the first device, and a maximum processing delay of forwarding the packet by the first device.

Therefore, in the embodiment of this application, the first device reserves a delay for processing a packet internally. The packet is forwarded to the third device only after the internal processing of the packet is completed.

In an embodiment, the third packet is the second packet, or the third packet is a packet that is sent by the second device and that is received by the first device after the first device determines that a time difference is not within the preset range.

In the embodiment of this application, the first device may determine whether to update the period-based mapping relationship, based on the second packet or based on a packet that is received by the first device from the second device after the first device determines that a time difference is not within the preset range, thereby providing a plurality of manners for updating the period-based mapping relationship.

In an embodiment, after the first device updates the period-based mapping relationship, the method further includes: The first device receives a fourth packet sent by the second device; the first device obtains a third period label carried in the fourth packet; and the first device forwards the fourth packet to the third device based on the third period label and an updated period-based mapping relationship.

In the embodiment of this application, after receiving the fourth packet sent by the second device, the first device may determine, based on the third period label carried in the fourth packet and the period-based mapping relationship, a forwarding period for the first device to forward the fourth packet, and forward the fourth packet to the third device in the forwarding period of the fourth packet. Therefore, after the first device updates the period-based mapping relationship in a timely manner, the fourth packet may be sent based on the updated period-based mapping relationship, thereby improving stability of packet transmission.

In an embodiment, that the first device forwards the fourth packet to the third device based on the third period label and an updated period-based mapping relationship includes: The first device determines, based on the third period label and the updated period-based mapping relationship, a forwarding period for forwarding the fourth packet to the third device; the first device replaces the third period label in the fourth packet with a fourth period label, where the forwarding period of the fourth packet corresponds to the fourth period label; and the first device sends, in the forwarding period of the fourth packet, the fourth packet carrying the fourth period label to the third device.

In the embodiment of this application, the forwarding period of the fourth packet is determined, the fourth period label corresponding to the forwarding period is also determined, the third period label carried in the fourth packet is replaced with the fourth period label, so that the third device receives the fourth packet having the third period label replaced with the fourth period label, and can determine, based on the fourth period label, a period for sending the fourth packet by the first device, and determine, based on the fourth period label and the period-based mapping relationship reserved by the third device, a period for the third device to forward the fourth packet to a next hop.

In an embodiment, the foregoing method further includes: If the first device determines that a fifth packet occupies the forwarding period of the fourth packet, the first device interrupts transmission of the fifth packet after data of the fifth packet that is transmitted in the forwarding period of the fourth packet exceeds a preset length.

In the embodiment of this application, when the fifth packet occupies the forwarding period of the fourth packet, the first device may interrupt transmission of the fifth packet in a timely manner, reducing impact on transmission of the fourth packet, so that the first device can send the fourth packet to the third device in a timely manner. For example, when the fourth packet is a delay-sensitive packet and the fifth packet is a delay-insensitive packet, transmission of the fifth packet may be interrupted in a timely manner, so that the fourth packet can be transmitted in a timely manner, thereby reducing a transmission delay of the fourth packet.

In an embodiment, after the first device updates the period-based mapping relationship, the method further includes: If the first device receives a sixth packet, the first device determines a second time difference between a receiving time of the sixth packet and a receiving time of the second packet, where the sixth packet is sent by the second device in any period after the period for sending the second packet; and the first device determines, based on the second time difference, whether to update the period-based mapping relationship again.

In the embodiment of this application, after the period-based mapping relationship is updated, the receiving time of the subsequently received sixth packet may be compared with the receiving time of the second packet, to determine whether to update the period-based mapping relationship again, thereby monitoring the link status between the first device and the second device. When an abnormal delay occurs between the first device and the second device, the period-based mapping relationship may be updated in a timely manner, thereby improving stability of packet transmission.

According to a third aspect of this application, a mapping relationship updating method is provided. The mapping relationship updating method includes: A second device inserts a first preset identifier into first data to obtain a first packet; the second device sends the first packet in a first period; the second device inserts a second preset identifier into second data to obtain a second packet; and the second device sends the second packet in a second period, so that the first device determines, based on the first packet and the second packet that are sequentially received, whether to update a period-based mapping relationship, where the period-based mapping relationship includes a mapping relationship between a first period label and a forwarding period, the first period label is an identifier carried in a packet sent by the second device to the first device, and the forwarding period is a period for the first device to forward the packet corresponding to the first period label to a third device.

In the embodiment of this application, the second packet may insert a preset identifier into received data, so that the first packet can monitor a packet carrying the preset identifier, and determine whether to update the period-based mapping relationship. When an abnormal delay occurs on a link between the first device and the second device, the first device may update the period-based mapping relationship in a timely manner, thereby improving stability of packet transmission.

In an embodiment, the first preset identifier is used to indicate that the first packet is the 1st packet sent by the second device in the first period, and the second preset identifier is used to indicate that the second packet is the 1st packet sent by the second device in the second period; or the first preset identifier is used to indicate an offset between a time at which the second device sends the first packet and a start time of the first period, and the second preset identifier is used to indicate an offset between a time at which the second device sends the second packet and a start time of the second period.

In the embodiment of this application, the second device may add a preset identifier to the first packet in a sending period, to indicate that the packet is a first packet in the sending period; or may add a preset identifier in any packet in a period, where the identifier is used to indicate an offset between a sending time of the packet and a start time of the period. Therefore, when receiving the first packet and the second packet, the second device may determine, in a timely manner based on the first preset identifier carried in the first packet and the second preset identifier carried in the second packet, whether the period-based mapping relationship needs to be updated, thereby monitoring a link status and improving stability of packet transmission.

According to a fourth aspect of this application, a network device is provided, including:
  a transceiver, configured to sequentially obtain a first packet and a second packet that are sent by a second device; and
  a processor, configured to determine a first time difference between a time at which the first packet is received and a time at which the second packet is received; where
  the processor is further configured to: if the first device determines that the first time difference is not within a preset range, update a period-based mapping relationship, where the period-based mapping relationship includes a mapping relationship between a first period label and a sending period, the first period label is an identifier carried in a packet sent by the second device to the first device, and the sending period is a period for the transceiver to forward the packet corresponding to the first period label to a third device.

According to a fifth aspect of this application, a network device is provided, including:
  a transceiver, configured to sequentially obtain a first packet and a second packet that are sent by a second device; and
  a processor, configured to determine a first time difference between a time at which the first packet is received and a time at which the second packet is received; where
  the processor is further configured to: if the first device determines that the first time difference is not within a preset range, determine that a link between the first device and the second device has been switched.

In an embodiment,
  the processor is further configured to: after detecting that the link between the first device and the second device has been switched, update a period-based mapping relationship, where the period-based mapping relationship includes a mapping relationship between a first period label and a sending period, the first period label is an identifier carried in a packet sent by the second device to the first device, and the sending period is a period for the first device to forward the packet corresponding to the first period label to a third device.

The following describes some embodiments based on the network device provided in the fourth aspect or the fifth aspect.

In an embodiment,
  the transceiver is specifically configured to sequentially receive at least two packets that are sent by the second device; and
  the processor is further configured to determine the first packet and the second packet from the at least two packets, where the first packet and the second packet each include a preset identifier.

In an embodiment, the first packet includes a first preset identifier, the second packet includes a second preset identifier, a period for the second device to send the first packet is a first period, and a period for the second device to send the second packet is a second period; and the first preset identifier is used to indicate that the first packet is the 1st packet sent by the second device in the first period, and the second preset identifier is used to indicate that the second packet is the 1st packet sent by the second device in the second period; or the first preset identifier is used to indicate an offset between a time at which the second device sends the first packet and a start time of the first period, and the second preset identifier is used to indicate an offset between a time at which the second device sends the second packet and a start time of the second period.

In an embodiment, the processor is specifically configured to:
  obtain a receiving time of a third packet, a preset processing duration, and a second period label carried in the third packet, where the second period label is used to indicate a period for the second device to send the third packet; and
  update the period-based mapping relationship based on the receiving time, the second period label, and the preset processing duration.

In an embodiment, the third packet is the second packet, or the third packet is a packet that is sent by the second device and that is received by the transceiver after the first device determines that the time difference is not within the preset range.

In an embodiment,
  the transceiver is further configured to, after the processor updates the period-based mapping relationship, receive a fourth packet sent by the second device;
  the processor is further configured to obtain a third period label carried in the fourth packet; and
  the transceiver is further configured to forward the fourth packet to the third device based on the third period label and an updated period-based mapping relationship.

In an embodiment,
  the processor is further configured to determine, based on the third period label and the updated period-based mapping relationship, a forwarding period for forwarding the fourth packet to the third device;
  the processor is further configured to replace the third period label in the fourth packet with a fourth period label, where the forwarding period of the fourth packet corresponds to the fourth period label; and
  the transceiver is further configured to send, in the forwarding period of the fourth packet, the fourth packet carrying the fourth period label to the third device.

In an embodiment,
  the processor is further configured to: if it is determined that a fifth packet occupies the forwarding period of the fourth packet, interrupt transmission of the fifth packet after data of the fifth packet that is transmitted in the forwarding period of the fourth packet exceeds a preset length.

In an embodiment,
  the processor is further configured to: after the first device updates the period-based mapping relationship, if the transceiver receives a sixth packet, determine a second time difference between a receiving time of the sixth packet and a receiving time of the second packet, where the sixth packet is sent by the second device in any period after the period for sending the second packet; and
  the processor is further configured to determine, based on the second time difference, whether to update the period-based mapping relationship again.

According to a sixth aspect of this application, a network device is provided, including:
  a processor, configured to insert a first preset identifier into first data to obtain a first packet; and
  a transceiver, configured to send the first packet in a first period; where
  the processor is further configured to insert a second preset identifier into second data to obtain a second packet; and
  the transceiver is further configured to send the second packet in a second period, so that a first device determines, based on the first packet and the second packet that are sequentially received, whether to update a period-based mapping relationship, where the period-based mapping relationship includes a mapping relationship between a first period label and a forwarding period, the first period label is an identifier carried in a packet sent by a second device to the first device, and the forwarding period is a period for the first device to forward the packet corresponding to the first period label to a third device.

In an embodiment,
  the first preset identifier is used to indicate that the first packet is the 1st packet sent by the transceiver in the first period, and the second preset identifier is used to indicate that the second packet is the 1st packet sent by the transceiver in the second period; or
  the first preset identifier is used to indicate an offset between a time at which the transceiver sends the first packet and a start time of the first period, and the second preset identifier is used to indicate an offset between a time at which the transceiver sends the second packet and a start time of the second period.

According to a seventh aspect of this application, a network device is provided, including a processor, a memory, and an input/output interface, where the processor and the memory are connected to the input/output interface, the memory is configured to store program code, and when the processor invokes the program code in the memory, the operations of the method according to any one of the first aspect or the implementations of the first aspect of this application are performed.

According to an eighth aspect of this application, a network device is provided, including a processor, a memory, and an input/output interface, where the processor and the memory are connected to the input/output interface, the memory is configured to store program code, and when the processor invokes the program code in the memory, the operations of the method according to any one of the second aspect or the implementations of the second aspect of this application are performed.

According to a ninth aspect of this application, a network device is provided, including a processor, a memory, and an input/output interface, where the processor and the memory are connected to the input/output interface; the memory is configured to store program code, and when the processor invokes the program code in the memory, the operations in the method according to any one of the third aspect or the implementations of the third aspect of this application are performed.

According to a tenth aspect of the embodiments of this application, a storage medium is provided. It should be noted that the technical solution of this application essentially, or a part that contributes to the prior art, or all or a part of the technical solution may be embodied in a form of software product. The computer software product is stored in a storage medium, and is configured to store a computer software instruction for use by the foregoing device, where the computer software product includes a program designed for the network device in any embodiment of any one of the first aspect to the third aspect.

The storage medium includes various media that may store program code, such as a USB flash drive, a removable hard disk, a read-only memory (ROM), a random access memory (RAM), a magnetic disk, or an optical disc.

According to an eleventh aspect of the embodiments of this application, a computer program product including an instruction is provided. When the computer program product runs on a computer, the computer is enabled to perform the method according to any one of the implementations of the first aspect to the third aspect of this application.

According to a twelfth aspect of this application, a chip system is provided, applied to a terminal device. The chip system includes a processor, configured to support the terminal device in implementing the functions according to any one of the first aspect or the implementations of the first aspect of this application. In a possible design, the chip system further includes a memory. The memory is configured to store program instructions and data that are necessary for a network device. The chip system may include a chip, or may include a chip and another discrete device.

According to a thirteenth aspect of this application, a chip system is provided, applied to a terminal device, where the chip system includes a processor, configured to support the terminal device in implementing the functions according to any one of the second aspect or the implementations of the second aspect of this application. In a possible design, the chip system further includes a memory. The memory is configured to store program instructions and data that are necessary for a network device. The chip system may include a chip, or may include a chip and another discrete device.

According to a fourteenth aspect of this application, a chip system is provided, applied to a terminal device. The chip system includes a processor, configured to support the terminal device in implementing the functions according to any one of the third aspect or the implementations of the third aspect of this application. In a possible design, the chip system further includes a memory. The memory is configured to store program instructions and data that are necessary for a network device. The chip system may include a chip, or may include a chip and another discrete device.

According to a fifteenth aspect of the embodiments of this application, a communications system is provided, where the communications system includes a first device and a second device, the first device may include the network device provided in the fourth aspect or the fifth aspect, and the second device may include the network device provided in the sixth aspect.

In this application, the first device, namely a downstream node, may sequentially obtain the first packet and the second packet that are sent by the second device, namely an upstream node. When the time difference between the time at which the first packet is received and the time at which the second packet is received is not within the preset range, the first device updates the period-based mapping relationship, so that the first device can forward a packet based on the updated period-based mapping relationship, and avoid abnormal data transmission caused by an abnormal link.

BRIEF DESCRIPTION OF DRAWINGS

FIG. 5A shows an IPv6 basic header according to an embodiment of this application;

FIG. 5B shows an IPv4 basic header according to an embodiment of this application;

FIG. 5C shows an IPv6 hop-by-hop packet header according to an embodiment of this application;

FIG. 5D shows an IPv6 routing extension header according to an embodiment of this application;

FIG. 5E shows an IPv6 segment routing extension header according to an embodiment of this application;

FIG. 5F shows a layer 2 Ethernet frame according to an embodiment of this application;

FIG. 5G shows an MPLS header field according to an embodiment of this application;

DETAILED DESCRIPTION

This application provides a mapping relationship updating method, applied to deterministic networking, so as to update a period-based mapping relationship in a timely manner after occurrence of an abnormal delay of a link is determined, thereby ensuring stable packet forwarding.

Figure 1A:
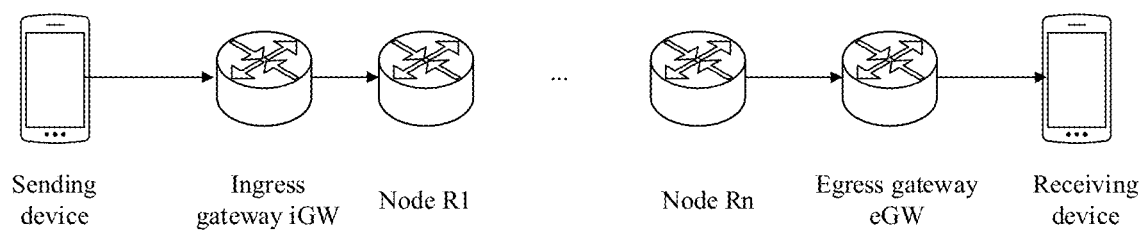
FIG. 1A is a schematic diagram of a network structure to which a mapping relationship updating method according to an embodiment of this application is applied.

FIG. 1A is a schematic diagram of a network structure to which a mapping relationship updating method according to this application is applied. A sending device, at least one node, and a receiving device are included. The at least one node may include an ingress gateway (iGW), a node R1 to a node Rn, an egress gateway (eGW), and the like shown in FIG. 1A. The iGW, the node R1 to the node Rn, and the eGW are sequentially connected. In addition, the node in embodiments of this application may also be referred to as a router, a forwarding device, or the like. The sending device and a node, and the receiving device and a node may be connected through an edge network, and nodes may be connected through a core network.

A period-based mapping relationship may be established on each node. The period-based mapping relationship includes a mapping relationship between a period label carried in a packet sent by an upstream node and a period for a downstream node to forward the packet to a next hop. It may be understood that the period-based mapping relationship may be a mapping relationship between a period for the upstream node to send a packet and the period for the downstream node to forward the packet.

A deterministic internet protocol (DIP) packet, that is, a packet transmitted when a deterministic delay condition is met, may be transmitted between the sending device and the receiving device. The deterministic delay may be understood as a delay and a variation of packet transmission being within a preset range on the premise that a specified sudden condition is met. Certainly, a non-DIP packet may also be transmitted between the sending device and the receiving device. In addition, the sending device may also receive data sent by the receiving device, that is, the sending device and the receiving device may transmit data to each other. In the following embodiments of this application, description is provided only by using an example in which the sending device sends data to the receiving device, but is not limited thereto.

The sending device sends the data to the receiving device sequentially through the iGW, the node R1 to the node Rn, and the eGW. To stabilize a delay in data transmission between the sending device and the receiving device, a node may define periods in time domain. When sending a packet to the downstream node, the upstream node may carry a period label. The period label may be used to indicate a period for the upstream node to send a packet to the downstream node. The downstream node may establish a period-based mapping relationship with the upstream node. The period-based mapping relationship includes a mapping relationship between a period label carried in a packet sent by the upstream node and a period for the downstream node to forward the packet to a next hop. Therefore, each node may stably forward a packet based on the period-based mapping relationship, so that a delay of packet transmission is controlled within a preset delay range, thereby implementing deterministic networking.

When data is transmitted between any two nodes, a link delay may change. For example, a delay change or a link clock drift caused by environmental impact (temperature, humidity, atmospheric pressure, or other factors) on an optical fiber, a delay caused by link preemption by a non-DIP packet, link switching, or the like may occur. Therefore, when the delay change occurs, it is possible that the downstream node cannot determine, based on the period-based mapping relationship established or updated before the delay change, a period for forwarding the packet, affecting deterministic packet transmission.

Figure 1B:
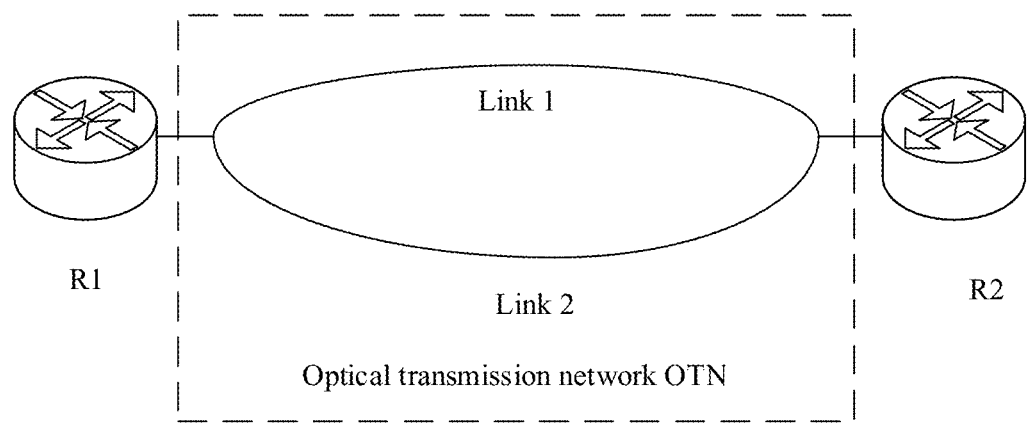
FIG. 1B is a schematic diagram of a link between nodes according to an embodiment of this application.

For example, FIG. 1B is a schematic diagram of a link connected between nodes according to this application. Nodes R1 and R2 are used as an example. One or more links may be established between R1 and R2, and a packet transmission delay may be different on each link due to impact of temperature, humidity, atmospheric pressure, or the like. This may lead to a sudden delay change, for example, an excessively large delay or an excessively small delay, in receiving a packet by a downstream node, and consequently the downstream node cannot correctly forward the packet, affecting deterministic packet transmission.

Therefore, this application provides a mapping relationship updating method, to update the period-based mapping relationship in the case of the delay changes, so that the downstream node can forward a packet to a next hop based on the updated period-based mapping relationship, thereby improving stability of packet transmission.

Based on FIG. 1A and FIG. 1B, the following describes in detail the mapping relationship updating method provided in this application by using two adjacent nodes, a first device and a second device, as an example.

Figure 2:
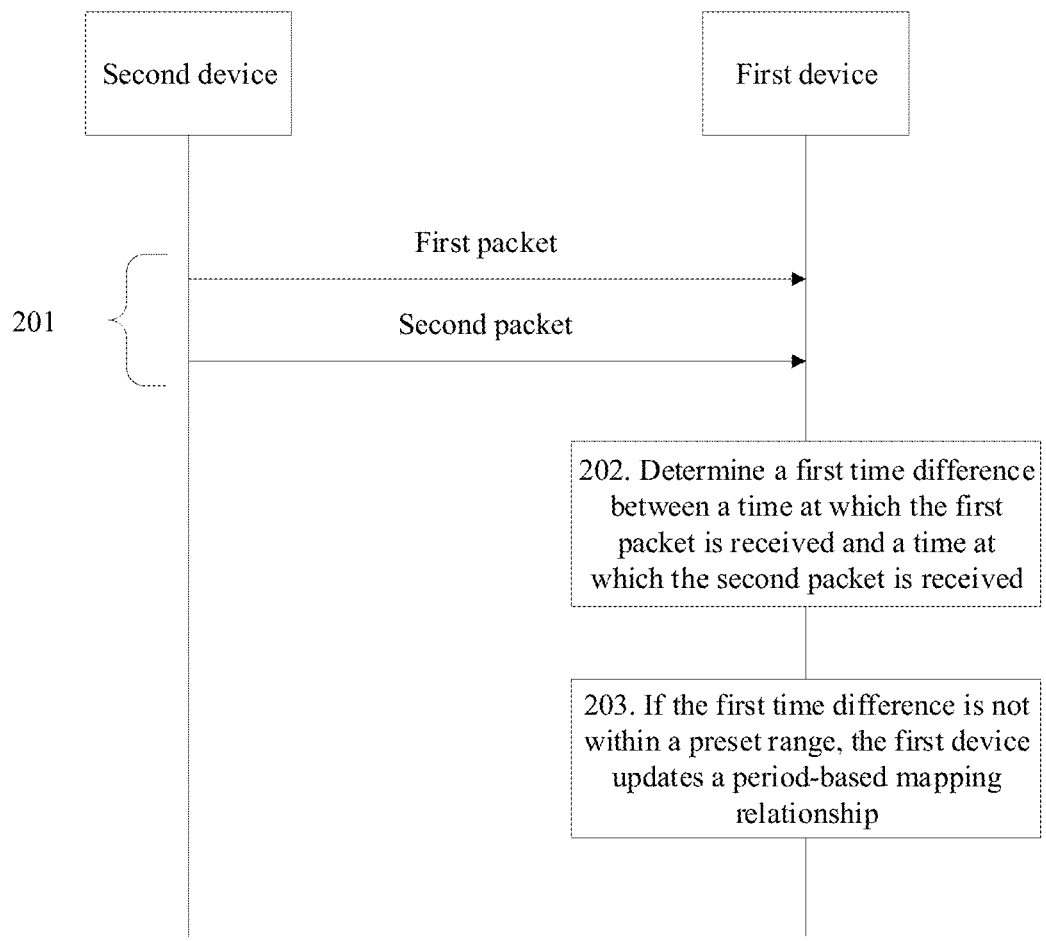
FIG. 2 is a schematic flowchart of a mapping relationship updating method according to an embodiment of this application.

FIG. 2 is a schematic flowchart of a mapping relationship updating method according to this application, as described below.

Operation 201. A second device sequentially sends a first packet and a second packet to a first device.

The first device and the second device may be any two adjacent nodes shown in FIG. 1A. In this embodiment of this application, the second device is an upstream node of the first device, and the first device is a downstream node of the second device.

In this embodiment of this application, the second device first sends the first packet to the first device, and then sends the second packet to the first device. The first device may sequentially receive the first packet and the second packet that are sent by the second device. In addition, a period for the second device to send the first packet is different from a period for the second device to send the second packet. The period for the second device to send the second packet and the period for the second device to send the first packet may be spaced apart by one or more periods, or may be two adjacent periods. For example, in the following embodiments of this application, a first period and a second period are used as an example for description. The second device may send the first packet to the first device in the first period, and send the second packet to the first device in the second period. The first period and the second period may be spaced apart by one or more periods, or the first period and the second period may be two adjacent periods.

In some embodiments, the first packet may be a packet that is sent by an upstream node of the second device to the second device and then forwarded by the second device to the first device; or may be signaling that is constructed by the second device and then sent by the second device to the first device. For example, the upstream node of the second device may be an iGW, and the iGW may send the first packet to the second device. The first packet carries a period label corresponding to a period for the iGW to send the first packet. For another example, when the second device receives no packet sent by the iGW, the second device may construct a first packet, and send the first packet to the first device.

In an embodiment, the first packet and the second packet each carry a preset identifier. The first packet may carry the first preset identifier, and the second packet may carry the second preset identifier. The first preset identifier is used to indicate that the first packet is the 1st packet sent by the second device in the first period, and the second preset identifier is used to indicate that the second packet is the 1st packet sent by the second device in the second period. The first device may determine, based on period labels carried in the first packet and the second packet, a period for the second device to send the first packet and the second packet. In the following implementations of this application, an identifier indicating that a packet is a first packet in a corresponding period may be referred to as a first-packet identifier. For example, the second device may add a first-packet identifier 1 to the first packet sent in each period, to indicate that the packet is a packet that is sent first in the period.

It should be noted that, the first period label mentioned in the following embodiments of this application refers to a period label carried in a packet sent by the second device to the first device.

Specifically, the second device may insert a preset identifier into the first packet sent in each period, or may insert a preset identifier after one or more periods, to indicate that the packet is a packet that is sent first in a corresponding period.

Figure 3:
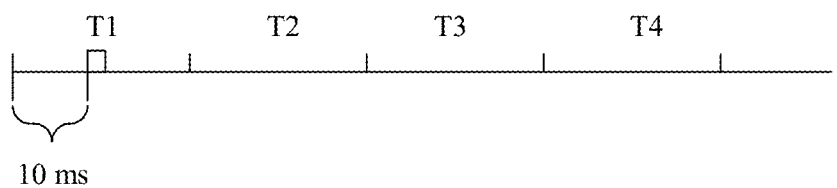
FIG. 3 is a schematic diagram of an offset value in a mapping relationship updating method according to an embodiment of this application.

In another embodiment, the first packet and the second packet each carry a preset identifier, and the preset identifier may be used to indicate an offset between a sending time of the packet and a start time of a period for the second device to send the packet. For example, the first preset identifier is used to indicate an offset between a time at which the second device sends the first packet and a start time of the first period, and the second preset identifier is used to indicate an offset between a time at which the second device sends the second packet and a start time of the second period. Specifically, in this scenario, the first preset identifier and the second preset identifier may be inserted into the packets by the second device, and an identifier carried in the packet sent by the second device to the first device may be used to indicate an offset between a sending time of the packet and a start time of a period for sending the packet. For example, as shown in FIG. 3, if the second device sends a packet in a period T1, and an offset value of the sending time of the packet and a start time of T1 is 10 ms, the second device may insert 10, an identifier that indicates 10 ms, or the like into the packet, so that when receiving the packet, the second device can determine the sending time of the packet based on the identifier carried in the packet.

Specifically, before the second device sends the first packet to the first device, the second device may insert a first preset identifier into first data, to obtain the first packet. Before the second device sends the second packet to the first device, the second device may insert a second preset identifier into second data, to obtain the second packet. The first data or the second data may be data received by the second device from the upstream node, or may be data generated by the second device.

In addition, when the second device is a first node, for example, the iGW shown in FIG. 1A, between the sending device and the receiving device, the packet received by the second device may not carry a preset identifier or a period label.

Operation 202. The first device determines a first time difference between a time at which the first packet is received and a time at which the second packet is received.

When receiving the first packet and the second packet, the first device may record the receiving time of the first packet and the receiving time of the second packet, and calculate a difference between the time at which the first packet is received and the time at which the second packet is received, to obtain the first time difference, that is, duration between the time at which the first device receives the first packet and the time at which the first device receives the second packet.

Specifically, the first packet may be a packet used for last update of a period-based mapping relationship, or may be one of the first N packets received after the last update of the period-based mapping relationship. A difference between a receiving time of each packet in the N packets and a receiving time of a packet used for the last update of the period-based mapping relationship is less than a threshold.

The N packets may each carry a preset identifier. It may be understood that, because the difference between the receiving time of each of the N packets and the receiving time of the packet used for the last update of the period-based mapping relationship is relatively small, after determining the receiving time of the second packet, the first device may calculate the first time difference by comparing the receiving time of the second packet with the receiving time of the packet used for the last update of the period-based mapping relationship, or may calculate the first time difference by comparing the receiving time of the second packet with the receiving time of each of the N packets. In this way, an error range of the calculated first time difference may be controlled within a range not greater than the threshold, so that an abnormal delay of the link can be detected, and whether to update the period-based mapping relationship can be determined. For example, the receiving time of the second packet is tx, the receiving time of the packet used for the last update of the period-based mapping relationship is t0, the receiving time of the N packets is t1 to tn, and a difference between tn and t0 is less than the threshold. Therefore, during subsequent calculation of the first time difference, a time difference between tx and t0 (hereinafter referred to as a time difference 1) may be calculated, or a time difference between tx and any one of t1 to tn (hereinafter referred to as a time difference 2) may be calculated. A difference between the time difference 1 and the time difference 2 is not greater than the threshold. Therefore, within a specific error range, when receiving the second packet, the first device may calculate the first time difference based on the receiving time of the packet used for the last update of the period-based mapping relationship, or may calculate the first time difference based on the receiving time of any one of the N packets, to correctly detect an abnormal delay of a link and determine whether the period-based mapping relationship needs to be updated in a timely manner. For example, if the second device defines periods T1 to T500, and corresponding period labels are 1 to 500, after performing period-based mapping update based on a packet carrying a preset identifier in T200 (that is, a first packet in the period T200), the first device may compare a receiving time of a subsequently received packet with a receiving time of the first packet in T200, to determine a time difference between the subsequently received packet with the receiving time of the first packet in T200, so as to determine whether to update the period-based mapping relationship again. Alternatively, the first device may compare a receiving time of a subsequently received packet with a receiving time of a first packet in any period within T(200+N), to determine whether to update the period-based mapping relationship again. A difference between the receiving time of the first packet in any period within T(200+N) and the receiving time of the first packet in the period T200 is less than a threshold, where N is a positive integer. For example, N is a relatively small positive integer such as 10 or 20. For example, after performing period-based mapping relationship update based on the first packet within the period T200, the first device may further determine the first packets in N periods after T200. Because a delay difference between T(200+N) and T200 is usually relatively small, impact of a clock drift on a delay is relatively small, or the like, the receiving time of the subsequently received packet may be alternatively compared with a receiving time of a first packet in any period within the period T(200+N), to determine whether to update the period-based mapping relationship again. In this way, the period-based mapping relationship can also be updated.

Operation 203. If the first time difference is not within a preset range, the first device updates the period-based mapping relationship.

After obtaining the first time difference, the first device determines whether the first time difference is within the preset range. If the first time difference is not within the preset range, the first device may update the period-based mapping relationship.

If the second preset identifier carried in the second packet is an offset between a time at which the second device sends the second packet and a start time of the second period, when determining whether a second time difference is within a preset range, the first device may adjust the first time difference or the preset range based on the offset value. Specifically, the offset value carried in the second packet may be subtracted from the second time difference, so as to determine whether the first time difference obtained after the offset value is subtracted is within the preset range. Alternatively, the offset value may be added to the preset range, so as to determine whether the first time difference is within a range obtained by the preset range plus the offset value. For example, if the offset value carried in the second packet is 10 ns, the first time difference is 200 ns, and the preset range is from 0 ns to 100 ns, 10 ns is subtracted from the first time difference 200 ns to obtain 190 ns, and it is then determined whether 190 ns is within a range of 0 ns to 100 ns. Alternatively, 10 ns is added to the preset range of 0 ns to 100 ns, that is, the preset range is updated to be 10 ns to 110 ns, and it is then determined whether 200 ns is within the range of 10 ns to 110 ns.

In addition, the preset range may be determined based on one or more factors, such as a delay caused by link preemption by a non-DIP packet, a delay variation of a link itself, a length of each period, and an interval between the time at which the second device sends the first packet and the time at which the second device sends the second packet, which may be specifically adjusted according to an actual application scenario. For example, if the time at which the second device sends the first packet and the time at which the second device sends the second packet are spaced apart by X periods, a length of each period is T, a maximum delay variation of the link is 50 ns, and a maximum delay resulting from a delay caused by link preemption by a non-DIP packet is 50 ns, the preset range is (X×T−50 ns)–(X×T+50 ns+50 ns).

The period-based mapping relationship includes a mapping relationship between a first period label carried in a packet sent by the second device to the first device and a period for the first device to forward the packet to a third device.

Specifically, the first device may obtain a third packet, where the third packet may be the second packet, or may be any packet received after the second packet. The first device may obtain a receiving time of the third packet, a preset processing duration, and a second period label carried in the third packet, and update the period-based mapping relationship. The preset processing duration may include a length of a period and maximum packet processing duration inside the first device. The preset processing duration may be added to the receiving time of the third packet, and a forwarding period in which a time obtained by adding the preset duration to the receiving time of the third packet falls is determined, to determine, based on the second period label and the forwarding period, whether to update the period-based mapping relationship.

It should be understood that, after receiving the first packet, the first device may send the first packet to the third device based on the period-based mapping relationship that has not been updated, and may record information about the first packet such as the receiving time of the first packet and the period label carried in the first packet, instead of sending the first packet to the third device after the second packet is received.

After updating the period-based mapping relationship, the first device may forward, based on the period-based mapping relationship, a packet sent by the second device. Specifically, the first device may read a period label carried in the packet sent by the second device, determine, based on the period label and the period-based mapping relationship, a forwarding period for forwarding the packet to the third device, replace the period label carried in the packet with a period label indicating the forwarding period, and send the packet with the updated period label to the third device.

In addition, when the first device is a last node in a link between the sending device and the receiving device, the first device may directly send a received packet to the receiving device, without adding a preset identifier and a period label to the packet.

It should be understood that, in the embodiments of this application, before the period-based mapping relationship update is completed, the first device may receive one or more packets, and may forward the one or more packets to the third device (that is, the receiving device or a downstream node of the first device) after the period-based mapping relationship update is completed. Alternatively, the first device may directly forward the one or more packets to the third device before the period-based mapping relationship update is completed. This may be specifically adjusted based on an actual application scenario, and is not limited in this application. For example, it usually takes time for the first device to update the period-based mapping relationship. Before the period-based mapping relationship update is completed, the first device may directly forward the second packet to the third device, improving efficiency of data transmission. Alternatively, the first device may wait until the period-based mapping relationship update is completed and then forward the second packet to the third device, improving reliability of data transmission.

Therefore, in this embodiment of this application, a receiving time difference between the second packet and the first packet may be checked, to determine whether a delay change caused by an abnormal link occurs, and update the period-based mapping relationship in a timely manner, so that the downstream node can update the period-based mapping relationship in a timely manner and forward, based on the period-based mapping relationship, a packet sent by the upstream node. Particularly, in deterministic networking, even if a sudden delay change, a clock drift, link switching, or the like occurs, packet transmission can be recovered in a timely manner, thereby improving stability of packet transmission.

The following describes in detail a mapping relationship updating method provided in this application by using a specific application scenario with reference to FIG. 2.

Figure 4:
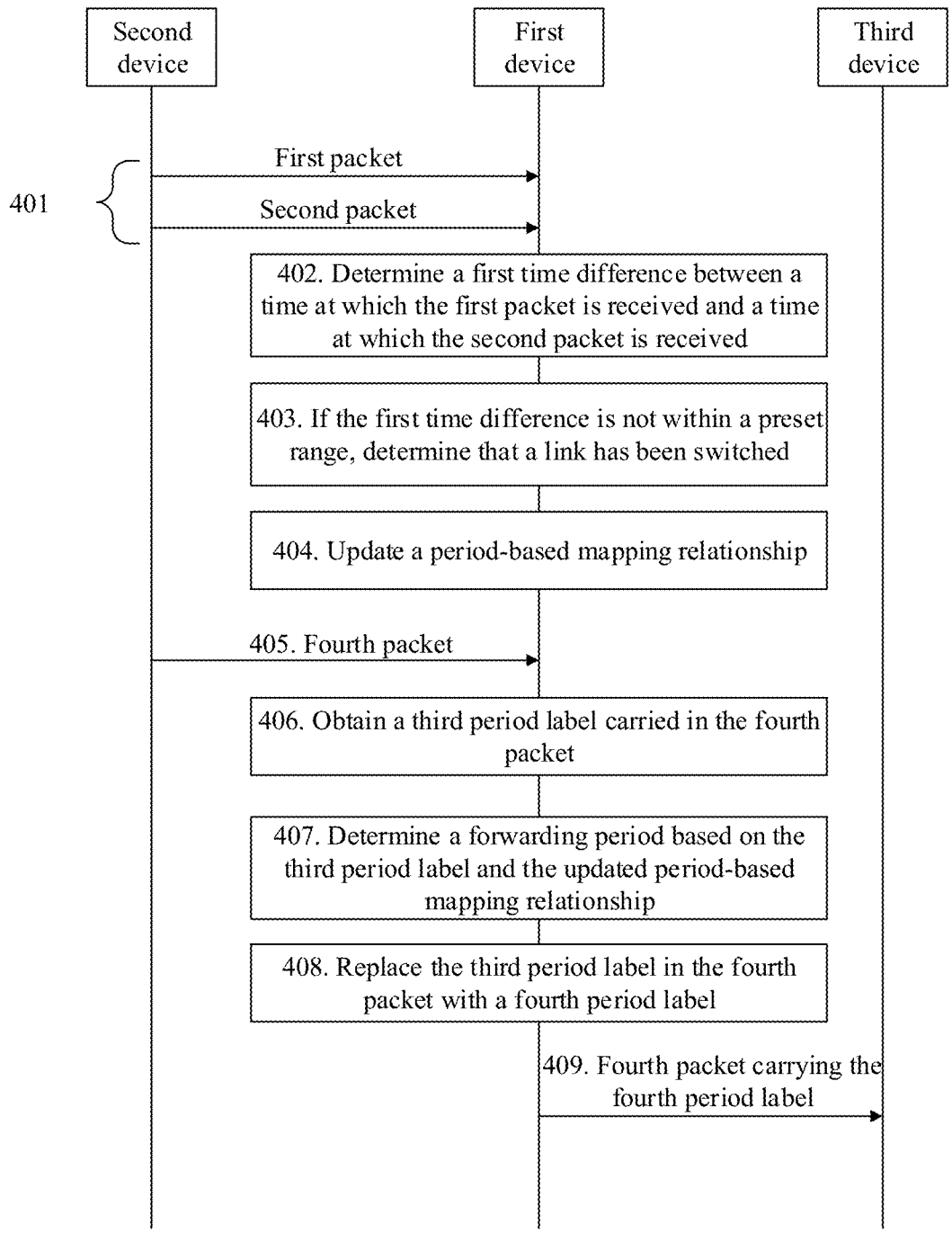
FIG. 4 is a schematic flowchart of another mapping relationship updating method according to an embodiment of this application.

FIG. 4 is another schematic flowchart of a mapping relationship updating method according to this application, as described below.

Operation 401. A second device sequentially sends a first packet and a second packet to a first device.

Operation 402. The first device determines a first time difference between a time at which the first packet is received and a time at which the second packet is received.

For operation 401 and operation 402, reference can be made to the foregoing operations 201 and 202. Details are not repeated herein again.

Still further, before operation 401, with the first packet as an example, a first preset identifier or a first period label carried in the first packet may be in different positions in the packet. The following describes some typical scenarios.

1. A period label is located in a basic header of a layer 3 data packet.

A. FIG. 5A shows an internet protocol version 6 (IPv6) basic header according to an embodiment of this application, including: version, traffic class, flow label, payload length, next header, hop limit, source address, and destination address. The first preset identifier or the first period label may be carried by the traffic class field.

B. FIG. 5B shows an internet protocol version 4 (IPv4) basic header according to an embodiment of this application, including: version, IP header length (IHL), type of service, total length, identification, flags, fragment offset, time to live (TTL), protocol, header checksum, source address, destination address, options, and padding. The period label may be carried by the type of service field. Differentiated services code point (DSCP) is a means of classifying quality of service (QoS). DSCP usually uses six bits of the type of service field. The type of service field still includes two unused bits, and the two unused bits may be used to carry the first preset identifier or the first period label. The first preset identifier or the first period label may be alternatively carried by DS CP.

2. The period label is located in an extension header of a layer 3 data packet.

C. FIG. 5C shows an IPv6 hop-by-hop packet header according to an embodiment of this application, including the following fields: next header, header extension length (Hdr Ext len), and options. The first preset identifier or the first period label may be carried in the options field, for example, carried by a TLV of the options field.

D. FIG. 5D shows an IPv6 routing extension header (Routing Header) according to an embodiment of this application, including: next header, header extension length, routing type, segment left, and type-specific data. The first preset identifier or the first period label may be carried in a reserve field in type-specific data. The routing type field is set to a standard-defined new value.

E. FIG. 5E shows an IPv6 segment routing (SR) extension header according to an embodiment of this application, including: next header, header extension length, routing type, segment left, last entry, flag, tag, at least one segment address, and optional Type Length Value objects (optional TLV). The first preset identifier or the first period label may be carried in the optional TLV field. In order that the optional TLV field can be parsed, a semantic meaning for a TLV parsed for each hop may be added to a suffix of the destination address in the IPv6 basic header to obtain and replace the period label.

3. The period label is located in a layer 2 data packet.

FIG. 5F shows a layer 2 Ethernet frame according to an embodiment of this application, including: preamble, start of frame delimiter, destination MAC address, source MAC address, 802.1Q tag (optional), Ether type, payload, and cyclic redundancy check (CRC). The first preset identifier or the first period label may be carried in the Ether type field or the 802.1Q tag field.

4. The period label is located in an MPLS header field.

G. FIG. 5G shows a multiprotocol label switching (Multiprotocol Label Switching MPLS) header field according to an embodiment of this application, including: routing label (Label), priority (Exp), stack bottom (S), and time to live. The first preset identifier or the first period label may be carried in the Exp field.

In addition, in an MPLS SR scenario, a plurality of MPLS routing labels may exist. Each hop device in a path needs to update the first preset identifier or the first period label carried in the first packet to a preset identifier or a period label for forwarding the packet to a next hop. The preset identifier or the period label may be stored in a position shown in FIG. 5G, or may be carried in the Exp field.

It should be understood that not all packets sent by the second device to the first device need to be added with the preset identifier or the first period label. The second device may add the preset identifier or the first period label in a DIP packet, and may not add the preset identifier or the first period label in a non-DIP packet.

Operation 403. If the first time difference is not within a preset range, the first device determines that a link has been switched.

In the embodiments of this application, if the first time difference is not within the preset range, the first device may determine that the link for data transmission between the first device and the second device has been switched. In this way, a mechanism for link switching detection by a downstream node is provided.

Figure 6:
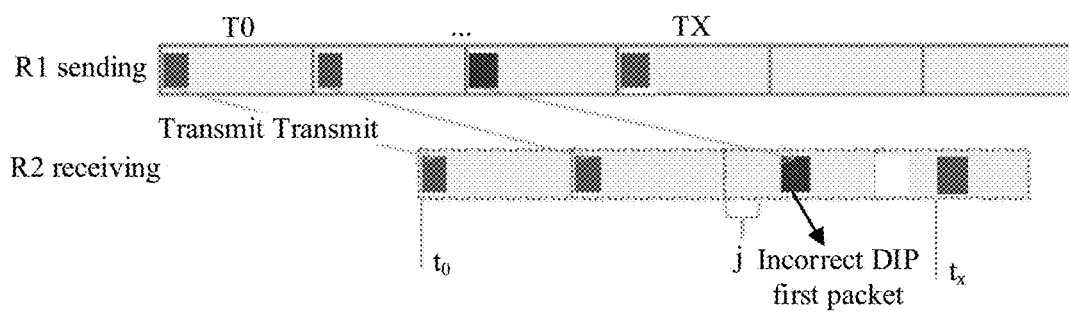
FIG. 6 is a schematic diagram of packet transmission in a mapping relationship updating method according to an embodiment of this application.

For example, as shown in FIG. 6, when link switching occurs, a packet received by R2 may experience an excessively large delay, such as an incorrect first DIP packet shown in FIG. 6. Generally, the first device reserves a j-microsecond delay variation for packet transmission. For example, j may be 50 ns. Therefore, if R2 receives, at a time t0, a packet (that is, the first packet) that is sent first in a T0 period by R1, and receives, at a time tx, a packet (that is, the second packet) that is sent first in a Tx period, and a result of tx−t0 is not within a range of (T×X)±j, the first device may determine that a link for data transmission between the first device and the second device has been switched, and that a period-based mapping relationship needs to be updated subsequently. T is duration of a period. X is a value of a period label carried in the packet that is sent first in the Tx period, or a number of a period.

For another example, after receiving each of one or more packets sent by R1, R2 may add a timestamp to the packet, that is, a receiving time of the packet. Specifically, R2 can add the timestamp by using a media access control (MAC) layer, a network processor (NP), a central processor (CPU), or the like. A forwarding engine (such as the NP or the CPU) of R2 parses the packet, and determines whether the packet carries a first-packet identifier, that is, whether the packet is a first packet in a period for R1 to send the packet. If the packet carries the first-packet identifier, the forwarding engine obtains a timestamp of the packet, that is, tx shown in FIG. 6, and obtains a period label L carried in the packet. $\Delta t$ is obtained according to $|t_x - t_0|$ mod XT. t0 may be understood as the receiving time of the foregoing first packet, T is duration of a period, X is a quantity of periods that are cyclically numbered, and XT may be adjusted based on a specific division manner of the periods. For example, if the periods are cyclically numbered by using four numbers (for example, T0 to T3), XT is 4T; if the periods are cyclically numbered by using six identifiers (for example, T0 to T5), XT is 6T. Then, a difference between $\Delta t$ and $L \times T$ is calculated. When the difference between $\Delta t$ and $L \times T$ is 200 ns, a value greater than 100 ns (that is, j is 100), R2 may determine that link switching, or link switchover, occurs between R1 and R2.

In addition, if the packet does not carry the first-packet identifier, but carries an offset value relative to a start time of a period for sending the packet, the offset value may be subtracted from Δt. For example, Δt=|T−t0| mod XT, where T is the offset value. Whether the link has been switched is determined based on a value obtained after the offset value is subtracted from Δt. Alternatively, an offset value is added to a value of the preset range, or the like, and whether the link for data transmission between the first device and the second device has been switched is determined based on a result of Δt plus the offset value or a preset range plus the offset value.

It should be noted that, in addition to link switching, a clock drift, or a delay change caused by environmental impact on a link may occur. This embodiment of this application is described only by using link switching as an example, but is not limited thereto.

Operation 404. The first device updates a period-based mapping relationship.

After the first device determines that the link for data transmission between the first device and the second device has been switched, the first device updates the period-based mapping relationship based on a packet that is received by the first device from the second device.

The following separately describes in detail the period-based mapping relationship and a procedure for updating the period-based mapping relationship.

Firstly, a meaning and a function of the period-based mapping relationship are described.

The period-based mapping relationship includes a mapping relationship between a first period label carried in a packet sent by the second device to the first device and a period for the first device to forward the packet to a third device. The period-based mapping relationship may be used by the downstream node to forward a packet sent by the upstream node.

Figure 7:
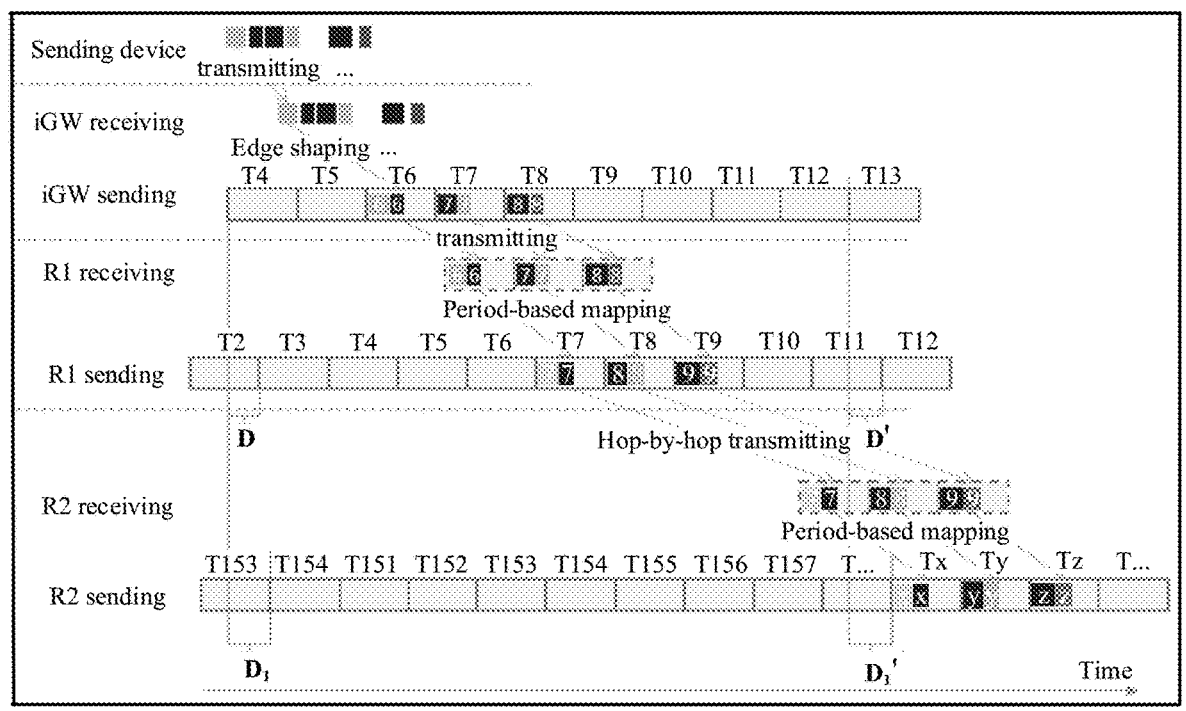
FIG. 7 is another schematic diagram of packet transmission in a mapping relationship updating method according to an embodiment of this application.

For example, FIG. 7 is a schematic diagram of data transmission according to this application. A sending device first sends a packet to an iGW, where the packet does not carry a period label or a preset identifier. Nodes (including the iGW, R1, and R2) in a link may perform period division, dividing a time domain resource into a plurality of periods, where all the periods may be of a same length. Periods defined by different nodes may be different in start time. For example, as shown in FIG. 7, a distance between period boundaries of any two nodes generally remains unchanged, differences between period boundaries of R1 and period boundaries of the iGW are D and and |D−D'|≤1 μs. Certainly, 1 μs may be changed to different values based on different scenarios. Similarly, differences between period boundaries of the iGW and R2 are $D_1$ and $D_1'$, and $|D_1-D_1'|≤1$ μs. After receiving the packet sent by the sending device, the iGW performs edge shaping on the received packet, so that a length of a packet forwarded by the iGW to R1 in a period does not exceed a supported transmission length. For example, a quantity of bytes of a packet sent in each period does not exceed Bi×T, where Bi may be a bandwidth limited for each stream by a service-level agreement (SLA), and T is a length of a period. Then, the iGW inserts a period label corresponding to the period for sending the packet into the packet, inserts a preset identifier into a first packet in each period, and then sends the packet to R1. As shown in FIG. 7, the iGW may send packets to R1 in T6, T7, and T8. After receiving the packets that can be sent by the iGW in the T6, T7, and T8 periods, R1 determines, based on a locally stored period-based mapping relationship, that periods for forwarding the packets to R2 are T7, T8, and T9. R1 replaces period labels indicating T6, T7, and T8 in the received packets with period labels indicating T7, T8, and T9 respectively, and sends the packets with the updated period labels to R2 in the T7, T8, and T9 periods. After receiving the packets sent by R1, R2 determines, based on a locally stored period-based mapping relationship, that forwarding periods are Tx, Ty, and Tz, replaces the period labels indicating T7, T8, and T9 with x, y, and z respectively, and sends the packets with the updated period labels to a next hop in the Tx, Ty, and Tz periods. The next hop may be a downstream node of R2, or may be a receiving device.

Specifically, the period-based mapping relationship may be represented by using a period-based mapping table, an adjustment value, or the like. When the period-based mapping relationship is represented by using a period-based mapping table, the table includes each period label, and one or more of a forwarding period corresponding to the period label, a label corresponding to the forwarding period, or the like. For example, the table may be shown in Table 1.

TABLE 1

| First period label | Forwarding period | Period label corresponding to forwarding label |
|---|---|---|
| 0 | T2 | 2 |
| 1 | T3 | 3 |
| 2 | T4 | 4 |
| 3 | T5 | 5 |
| ... | ... | ... |

The first period label is a period label carried in a packet sent by the second device to the first device, and the first period label is used to indicate a period for the second device to send the packet. For example, if the first period label is 0, it indicates that a period for the second device to send the packet is T0; if the first period label is 1, it indicates that a period for the second device to send the packet is T1; and so on. The forwarding period is a period for the first device to forward a packet to the third device. As shown in Table 1, when the first period label is 0, the forwarding period for the first device is T2, and a period label corresponding to the forwarding period is 2; when the first period label is 1, a forwarding period for the first device is T3, and a period label corresponding to the forwarding period is 3; and so on. Therefore, after receiving the packet sent by the second device, the first device may read the first period label carried in the packet, and query the period-based mapping table for a corresponding forwarding period and a period label corresponding to the forwarding period. The first device replaces the first period label with the period label corresponding to the forwarding period, and then sends the packet with the updated period label to the third device.

When the period-based mapping relationship is represented by using an adjustment value, after receiving a packet sent by the second device, the first device reads a first period label carried in the packet, performs an operation on the period label and the adjustment value to obtain a period label corresponding to a forwarding period, determines the forwarding period based on the period label corresponding to the forwarding period, replaces the first period label carried in the packet with the period label corresponding to the forwarding period, and sends the packet the updated period label to the third device. For example, if the adjustment value is 3, and the first period label carried in the packet sent by the second device is 1, the period label corresponding to the forwarding period is calculated as 3+1=4, so that the forwarding period is determined as T4. Then 1 carried in the packet is replaced with 4, and the packet is sent to the third device in T4.

Secondly, a specific process of updating the period-based mapping relationship is described.

For example, the period-based mapping relationship is updated by using a third packet. A specific manner for updating the period-based mapping relationship may include: The first device obtains a receiving time of the third packet, a preset processing duration, and a first period label carried in the third packet. Herein, for better differentiation, the first period label carried in the third packet is referred to as a second period label, and the second period label is used to indicate a period for the second device to send the third packet. The first device updates the period-based mapping relationship based on the receiving time, the second period label, and the preset processing duration.

The third packet may be a second packet, or may be any packet that is received after the second packet and that carries a preset identifier. The preset processing duration may include: duration of receiving the first byte to the last byte by the first device from the second device in a same period, and maximum processing duration for forwarding the packet by the first device. The maximum processing duration may include a route lookup delay, a switching network scheduling delay, an internal link transmission delay of the R1 device, a read/write delay in packet storage, and the like.

Figure 8:
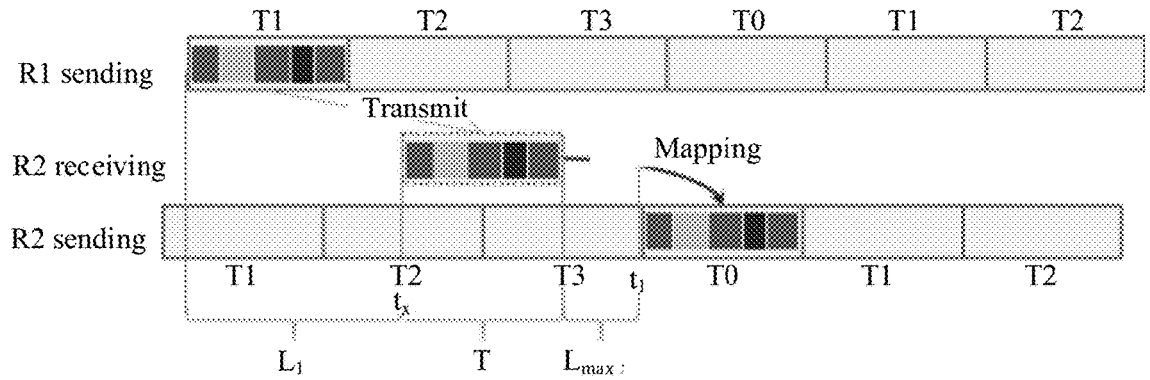
FIG. 8 is another schematic diagram of packet transmission in a mapping relationship updating method according to an embodiment of this application.

For example, as shown in FIG. 8, during period division by R1 and R2, period labels may be marked by 0 to 3, corresponding to periods T0 to T3. When sending a third packet, R1 inserts a label L indicating the period into the third packet. If the third packet is a packet that is sent first in a period TL, R1 adds a first-packet identifier to the third packet. After receiving one packet carrying the preset identifier, R2 records a receiving time tx of the third packet, and calculates a latest forwarding time t1 of the packet, where t1=t0+T+L max, t0 is a time at which the third packet arrives at an ingress of R2, T+L max is a preset processing duration, T is duration of a period of R1, and L max is maximum processing duration inside the R2 device. Then, a period in which the latest forwarding time of the third packet falls is calculated according to [(t1−t0)/T+1] mod 4. T0 is obtained, as shown in FIG. 8. The period-based mapping relationship may be expressed as delta=(0−1+4) mod 4=3, that is, 3 is an adjustment value. For example, when the packet received by R2 carries a period label 0, a period label of a corresponding forwarding period is 0+3=3, and the corresponding forwarding period is T3. Alternatively, the period-based mapping relationship may be represented as a period-based mapping table. After delta=(0−1+4) mod 4=3 is obtained, period labels carried in the packets sent by R1 to R2 and forwarding periods for forwarding the packets by R2 or period labels corresponding to the forwarding periods may be listed, to obtain the period-based mapping table. When R2 receives the packet sent by R1, R2 may query the period-based mapping table to determine the forwarding period of the packet or the period label corresponding to the forwarding period.

In addition, when the preset identifier carried in the packet indicates an offset between a time for sending the packet and a start time of a period for sending the packet, an offset value may be added to a latest forwarding time t1 of the third packet, that is, t1=t0+T+L max−T. T is the offset value. It may be understood that a first packet in the same period as the third packet arrives at R2 at a time T0−T. Subsequent calculation of the forwarding period is performed in the same way as that described above.

Figure 9:
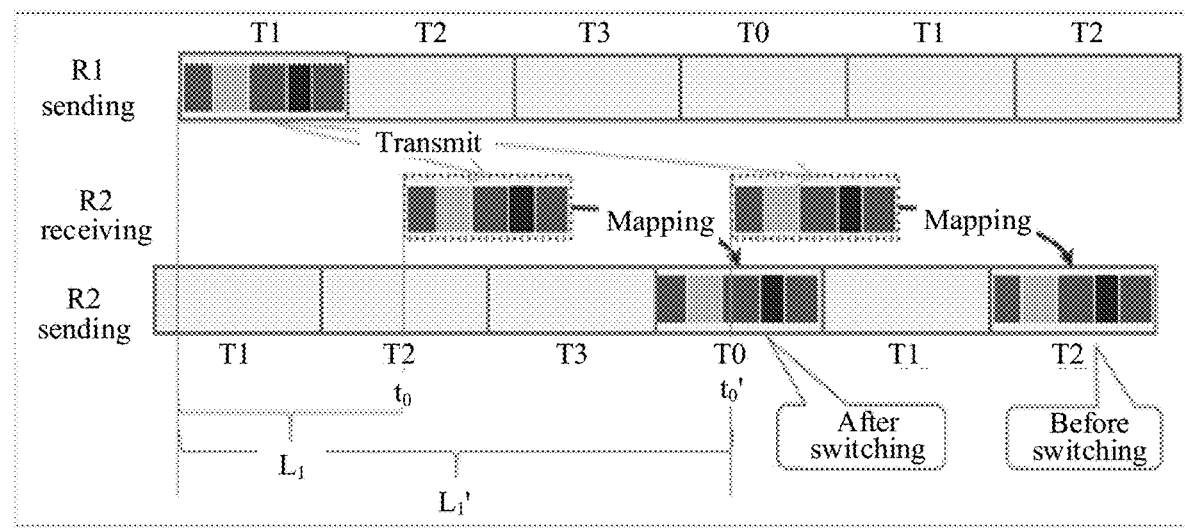
FIG. 9 is another schematic diagram of packet transmission in a mapping relationship updating method according to an embodiment of this application.

For example, as shown in FIG. 9, after link switching, a period label corresponding to a T1 period of R1 is mapped to a T0 period of R2. However, before link switching, the period label corresponding to the T1 period of R1 is mapped to a T2 period of R2. R2 may send the packet based on the updated period-based mapping relationship, thereby implementing stable and efficient transmission of a DIP packet.

Operation 405. The second device sends a fourth packet to the first device.

After the first device updates the period-based mapping relationship, the second device may send the fourth packet to the first device.

Specifically, if the first device determines that the link for data transmission between the first device and the second device has been switched, the fourth packet may be a packet transmitted on the switched-to link.

Operation 406. Obtain a third period label carried in the fourth packet.

After receiving the fourth packet sent by the second device, the first device reads the third period label carried in the fourth packet. The third period label is used to indicate a period for the second device to send the fourth packet to the first device.

Specifically, because the period label may be inserted into different positions such as an IPv6 basic header and an IPv4 basic header as described in operation 402, the first device may read the third period label from different positions such as the IPv6 basic header and the IPv4 basic header of the fourth packet as described in operation 402.

Operation 407. Determine a forwarding period based on the third period label and the updated period-based mapping relationship.

After reading the first period label carried in the fourth packet, which is hereinafter referred to as a third period label, the first device may determine, based on the third period label, a forwarding period for forwarding the fourth packet to the third device.

Specifically, after reading the third period label, the first device may determine, based on the period-based mapping relationship, a period label of the forwarding period corresponding to the third period label, that is, a fourth period label, and determine, based on the local mapping relationship between period labels and periods, the forwarding period indicated by the fourth period label. Alternatively, after reading the third period label, the first device may directly read the forwarding period from data of the period-based mapping relationship, and determine the fourth period label based on the local mapping relationship between period labels and periods.

Operation 408. Replace the third period label in the fourth packet with the fourth period label.

After the third period label is obtained, the forwarding period of the fourth packet and the fourth period label indicating the forwarding period may be determined, and the third period label carried in the fourth packet is replaced with the fourth period label.

Operation 409. The first device sends the fourth packet carrying the fourth period label to the third device.

After replacing the third period label carried in the fourth packet with the fourth period label, the first device sends the fourth packet carrying the fourth period label to the third device.

It should be understood that the first device may receive one or more fourth packets carrying the third period label, and forward the one or more fourth packets to the third device in a same forwarding period, and a specific quantity of fourth packets forwarded by the first device may be adjusted according to an actual application scenario. In this application, only one fourth packet is used as an example for illustrative description.

Therefore, in the embodiment of this application, a receiving time difference between the second packet and the first packet may be checked, to determine whether a delay change caused by an abnormal link occurs, and update the period-based mapping relationship in a timely manner, so that the downstream node can update the period-based mapping relationship in a timely manner and forward, based on the period-based mapping relationship, the packet sent by the upstream node. Particularly, in deterministic networking, even if a sudden delay change, a clock drift, link switching, or the like occurs, packet transmission can be recovered in a timely manner, thereby improving stability of packet transmission.

Figure 10:
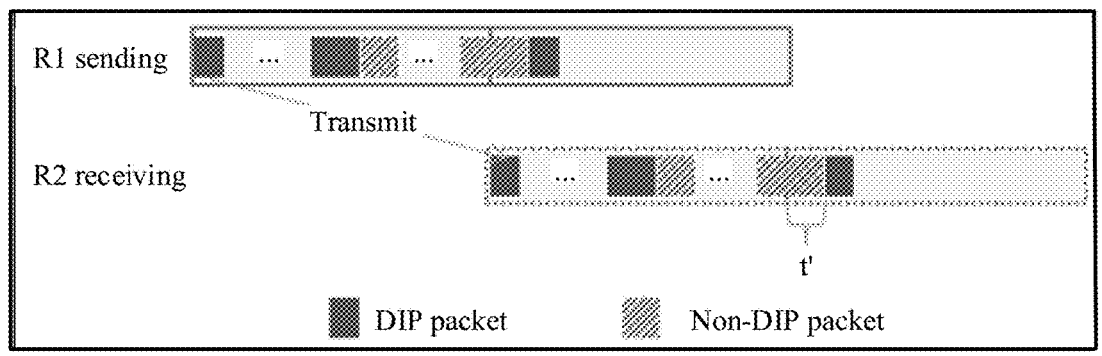
FIG. 10 is another schematic diagram of packet transmission in a mapping relationship updating method according to an embodiment of this application.

In an embodiment, if the first device determines that a fifth packet occupies the forwarding period of the fourth packet, after data of the fifth packet transmitted in the forwarding period exceeds a preset length, the first device may interrupt transmission of the fifth packet to stop the fifth packet from occupying the forwarding period, and transmit the fourth packet in the forwarding period. For example, as shown in FIG. 10, to reduce impact of a non-DIP packet on a to-be-transmitted DIP packet, when R2 is transmitting the non-DIP packet in a forwarding period, transmission of the non-DIP packet can be interrupted after transmission duration of the non-DIP packet exceeds t', and the DIP packet mapped to the forwarding period starts being sent in the forwarding period. Generally, if R2 has a transmit bandwidth of 10 Gbit/s and related specifications in 802.3BR are supported, the earliest interruption position is 64 bytes. However, for different bandwidths, earliest interruption positions or delays may be different, as shown in Table 2.

TABLE 2

| Earliest interruption position | Bandwidth | | |
| --- | --- | --- | --- |
| | 1 Gbit/s | 10 Gbit/s | 100 Gbit/s |
| 64 bytes | 0.5 μs | 50 ns | 5 ns |
| 128 bytes | 1 μs | 0.1 μs | 10 ns |
| 192 bytes | 1.5 μs | 0.15 μs | 15 ns |

When the bandwidth is 1 Gbit/s, if a required latest delay is 0.5 μs, the earliest interruption location is 64 bytes; if a required latest delay is 1 μs, the earliest interrupt location is 128 bytes; if the required latest delay is 1.5 μs, the earliest interrupt position is 192 bytes; and so on.

In addition, according to the delay described in Table 2, the latest delay corresponding to the earliest interruption position may be added to the delay variation j. For example, if j is 50 ns, and the delay corresponding to the earliest interrupt location is 50 ns, j may be adjusted to 100 ns.

Therefore, in the embodiment of this application, when a non-DIP packet occupies a resource of a DIP packet, transmission of the non-DIP packet may be interrupted, so that the DIP packet can be transmitted by using an unoccupied resource, thereby reducing a transmission delay of the DIP packet and improving transmission efficiency of the DIP packet.

In an embodiment, after receiving a sixth packet sent by the second device, the first device may further calculate a difference between a receiving time of the sixth packet and a receiving time of the second packet, to obtain a second time difference, and determine, based on the second time difference, whether the period-based mapping relationship needs to be updated again. The sixth packet may be any packet carrying a preset identifier after the second device sends the second packet. Therefore, in the embodiment of this application, a preset identifier may be inserted into a packet, so that the downstream node can determine, based on the packet carrying the preset identifier, whether to update the period-based mapping relationship. In this way, a delay change of a link can be detected in a timely manner, and the period-based mapping relationship can be updated in a timely manner, thereby improving reliability of packet transmission.

The method provided in this application has been described in detail above. The following describes an apparatus provided in this application based on FIG. 1A to FIG. 10.

Figure 11:
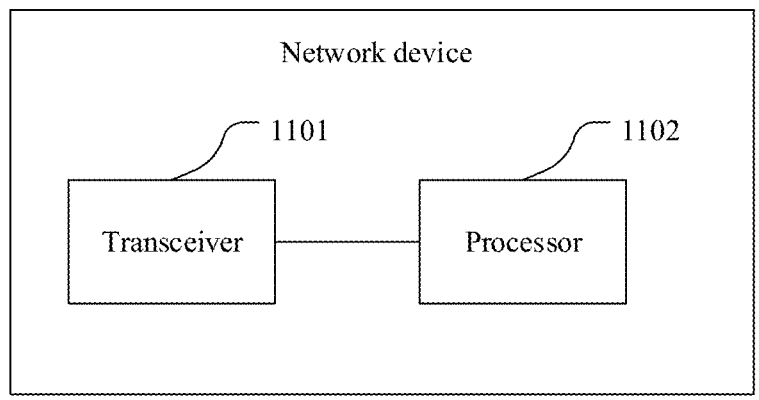
FIG. 11 is a schematic structural diagram of a network device according to an embodiment of this application.

FIG. 11 is a schematic structural diagram of a network device according to this application. Details are as follows:

The network device may be configured to perform any operation performed by the first device in FIG. 2 to FIG. 10.

The network device includes:
a transceiver 1101, configured to sequentially obtain a first packet and a second packet that are sent by a second device; and
a processor 1102, configured to determine a first time difference between a time at which the first packet is received and a time at which the second packet is received; where
the processor 1102 is further configured to: if the first device determines that the first time difference is not within a preset range, update a period-based mapping relationship, where the period-based mapping relationship includes a mapping relationship between a first period label and a sending period, the first period label is an identifier carried in a packet sent by the second device to the first device, and the sending period is a period for the transceiver 1101 to forward the packet corresponding to the first period label to a third device.

In an embodiment,
the transceiver 1101 is specifically configured to sequentially receive at least two packets that are sent by the second device; and
the processor 1102 is further configured to determine the first packet and the second packet from the at least two packets, where the first packet and the second packet each include a preset identifier.

In an embodiment, the first packet includes a first preset identifier, the second packet includes a second preset identifier, a period for the second device to send the first packet is a first period, and a period for the second device to send the second packet is a second period; and the first preset identifier is used to indicate that the first packet is the 1st packet sent by the second device in the first period, and the second preset identifier is used to indicate that the second packet is the 1st packet sent by the second device in the second period; or the first preset identifier is used to indicate an offset between a time at which the second device sends the first packet and a start time of the first period, and the second preset identifier is used to indicate an offset between a time at which the second device sends the second packet and a start time of the second period.

In an embodiment, the processor 1102 is specifically configured to:
obtain a receiving time of a third packet, a preset processing duration, and a second period label carried in the third packet, where the second period label is used to indicate a period for the second device to send the third packet; and update the period-based mapping relationship based on the receiving time, the second period label, and the preset processing duration.

In an embodiment, the third packet is the second packet, or the third packet is a packet that is sent by the second device and that is received by the transceiver 1101 after the first device determines that the time difference is not within the preset range.

In an embodiment, the transceiver 1101 is further configured to receive a fourth packet sent from the second device after the processor 1102 updates the period-based mapping relationship;

the processor 1102 is further configured to obtain a third period label carried in the fourth packet; and the transceiver 1101 is further configured to forward the fourth packet to the third device based on the third period label and an updated period-based mapping relationship.

In an embodiment, the processor 1102 is further configured to determine, based on the third period label and the updated period-based mapping relationship, a forwarding period for forwarding the fourth packet to the third device;

the processor 1102 is further configured to replace the third period label in the fourth packet with a fourth period label, where the forwarding period of the fourth packet corresponds to the fourth period label; and the transceiver 1101 is further configured to send, in the forwarding period of the fourth packet, the fourth packet carrying the fourth period label to the third device.

In an embodiment, the processor 1102 is further configured to: if it is determined that a fifth packet occupies the forwarding period of the fourth packet, interrupt transmission of the fifth packet after data of the fifth packet that is transmitted in the forwarding period of the fourth packet exceeds a preset length.

In an embodiment, the processor 1102 is further configured to: after the first device updates the period-based mapping relationship, if the transceiver 1101 receives a sixth packet, determine a second time difference between a receiving time of the sixth packet and a receiving time of the second packet, where the sixth packet is sent by the second device in any period after the period for sending the second packet; and the processor 1102 is further configured to determine, based on the second time difference, whether to update the period-based mapping relationship again.

Figure 12:
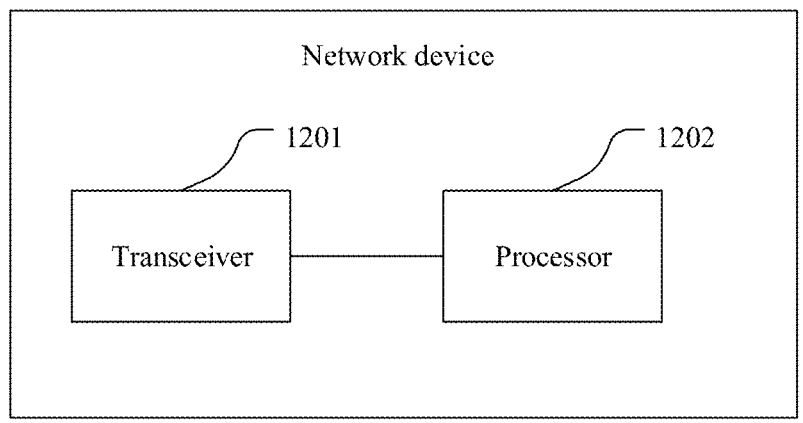
FIG. 12 is a schematic structural diagram of another network device according to an embodiment of this application.

FIG. 12 is a schematic structural diagram of another network device according to this application. Details are as follows:

The network device may be configured to perform any operation performed by the second device in FIG. 2 to FIG. 10.

The network device includes:

a processor 1202, configured to insert a first preset identifier into first data to obtain a first packet;

a transceiver 1201, configured to send the first packet in a first period; where the processor 1202 is further configured to insert a second preset identifier into second data to obtain a second packet; and the transceiver 1201 is further configured to send the second packet in a second period, so that a first device determines, based on the first packet and the second packet that are sequentially received, whether to update a period-based mapping relationship, where the period-based mapping relationship includes a mapping relationship between a first period label and a forwarding period, the first period label is an identifier carried in a packet sent by a second device to the first device, and the forwarding period is a period for the first device to forward the packet corresponding to the first period label to a third device.

In an embodiment, the first preset identifier is used to indicate that the first packet is the 1st packet sent by the transceiver 1201 in the first period, and the second preset identifier is used to indicate that the second packet is the 1st packet sent by the transceiver 1201 in the second period; or the first preset identifier is used to indicate an offset between a time at which the transceiver 1201 sends the first packet and a start time of the first period, and the second preset identifier is used to indicate an offset between a time at which the transceiver 1201 sends the second packet and a start time of the second period.

Figure 13:
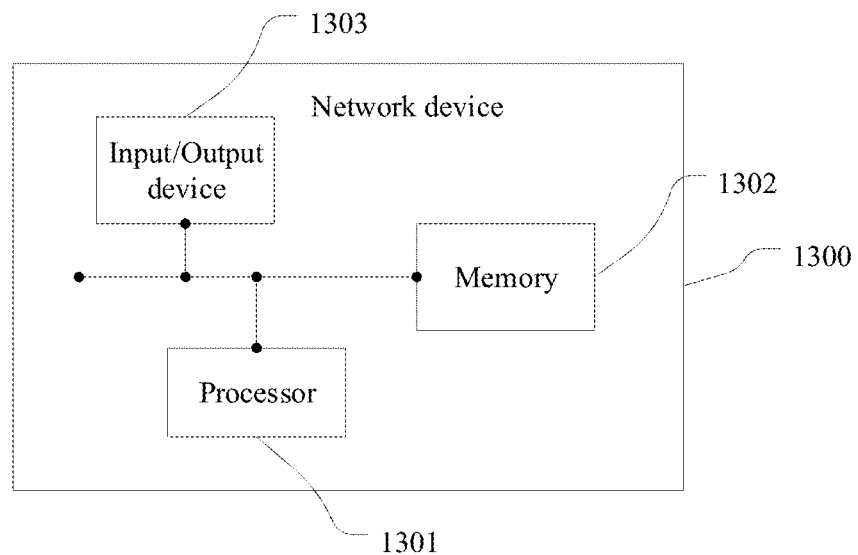
FIG. 13 is a schematic structural diagram of another network device according to an embodiment of this application.

This application further provides another network device 1300. FIG. 13 shows an embodiment of a network device in the embodiments of this application. The network device may be configured to perform operations performed by the first device in any embodiment shown in FIG. 2 to FIG. 10. Reference may be made to the related descriptions in the foregoing method embodiments.

The network device 1300 includes a processor 1301, a memory 1302, and an input/output device 1303.

In an embodiment, the processor 1301, the memory 1302, and the input/output device 1303 are separately connected to a bus, and the memory stores computer instructions.

The transceiver 1101 in the foregoing embodiment may be the input/output device 1303 in this embodiment. Therefore, implementation of the input/output device 1303 is not described.

The processor 1102 in the foregoing embodiment may be the processor 1301 in this embodiment. Therefore, implementation of the processor 1301 is not described.

In an implementation, the network device 1300 may include more or fewer components than those in FIG. 13. This application is merely an example for description, and is not limited.

Figure 14:
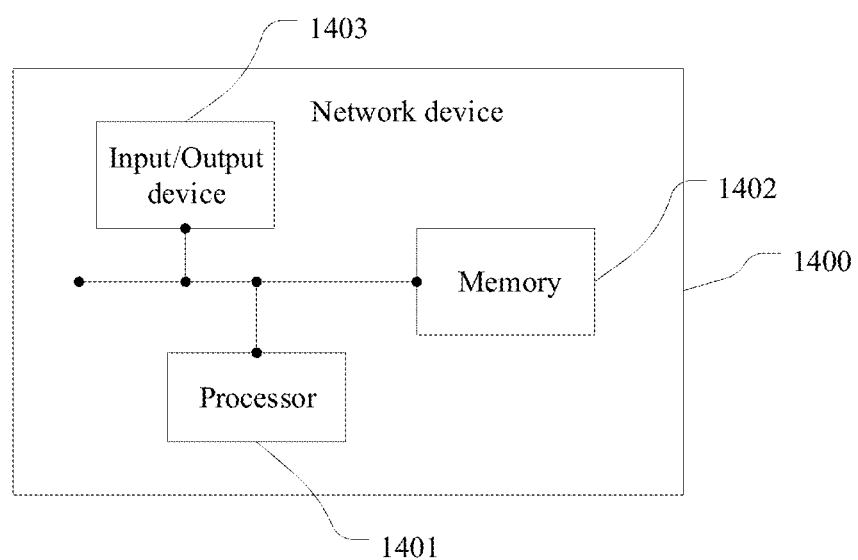
FIG. 14 is a schematic structural diagram of another network device according to an embodiment of this application.

This application further provides another network device 1400. FIG. 14 shows an embodiment of a network device in the embodiments of this application. The network device may be configured to perform operations performed by the first device in any embodiment shown in FIG. 2 to FIG. 10. Reference may be made to the related descriptions in the foregoing method embodiments.

The network device 1400 includes a processor 1401, a memory 1402, and an input/output device 1403.

In an embodiment, the processor 1401, the memory 1402, and the input/output device 1403 are separately connected to a bus, and the memory stores computer instructions.

The transceiver 1201 in the foregoing embodiment may be the input/output device 1403 in this embodiment. Therefore, implementation of the input/output device 1403 is not described.

The processor 1202 in the foregoing embodiment may be the processor 1401 in this embodiment. Therefore, implementation of the processor 1401 is not described.

In an implementation, the network device 1400 may include more or fewer components than those in FIG. 14. This application is merely an example for description, and is not limited.

This application further provides a data transmission system. The data transmission system includes a first device and a second device.

The first device is the network device shown in FIG. 11 or FIG. 13, and may be configured to perform operations performed by the first device in any implementation shown in FIG. 2 to FIG. 10.

The second device is the network device shown in FIG. 12 or FIG. 14, and may be configured to perform operations performed by the second device in any implementation shown in FIG. 2 to FIG. 10.

This application provides a chip system. The chip system includes a processor, configured to support a network device in implementing functions in the foregoing aspects, for example, sending or processing data and/or information in the foregoing methods. In a possible design, the chip system further includes a memory, and the memory is configured to store a necessary program instruction and data. The chip system may include a chip, or may include a chip and another discrete device.

In another possible design, when the chip system is a chip in a network device, the chip includes a processor and a communications unit. The processor may be, for example, a processor, and the communications unit may be, for example, an input/output interface, a pin, or a circuit. The processor may execute a computer-executable instruction stored in a storage unit, so that a chip in the network device or the like performs the operations of the method performed by the first device or the second device in any one of the embodiments in FIG. 2 to FIG. 10. Optionally, the storage unit is a storage unit in the chip, for example, a register or a cache, or the storage unit may be a storage unit in a network device that is located outside the chip, for example, a read-only memory (read-only memory, ROM), another type of static storage device that can store static information and an instruction, or a random access memory (random access memory, RAM).

An embodiment of this application further provides a processor, configured to be coupled to a memory, and configured to perform the method and the function related to the first device in any one of the foregoing embodiments.

An embodiment of this application further provides a processor, configured to be coupled to a memory, and configured to perform the method and the function related to the second device in any one of the foregoing embodiments.

An embodiment of this application further provides a computer-readable storage medium, where a computer program is stored in the computer-readable storage medium. When the computer program is executed by a computer, a method procedure related to the first device or the second device in any one of the foregoing method embodiments is implemented. Correspondingly, the computer may be the foregoing network device.

It should be understood that the processor in the network device in the foregoing embodiments of this application or the processor provided in the foregoing embodiments of this application may be a central processor (CPU), or may be another general purpose processor, a digital signal processor (DSP), an application-specific integrated circuit (ASIC), a field programmable gate array (FPGA) or another programmable logic device, a discrete gate or a transistor logic device, a discrete hardware component, or the like. The general purpose processor may be a microprocessor, or the processor may be any conventional processor or the like.

It should be further understood that in the foregoing embodiments of this application, there may be one or more processors in the network device, and the quantity may be adjusted based on an actual application scenario. This is merely an example for description, and this application is not limited thereto. In the embodiments of this application, there may be one or more memories, and the quantity may be adjusted based on an actual application scenario. This is merely an example for description, and this application is not limited thereto.

It should be further understood that the memory, the readable storage medium, or the like in the network device, the chip system, and the like in the foregoing embodiments of this application may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) and is used as an external cache. By way of example but not restrictive description, many forms of RAMs are available, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

It should be further noted that when the network device includes a processor (or a processor) and a memory, the processor in this application may be integrated with the memory, or the processor may be connected to the memory by using an interface. This may be adjusted based on an actual application scenario, and is not limited.

An embodiment of this application further provides a computer program or a computer program product including the computer program. When the computer program is executed on a computer, the computer is enabled to implement a method procedure of the first device or the second device in any one of the foregoing method embodiments. Correspondingly, the computer may be the foregoing network device.

All or some of the foregoing embodiments in FIG. 2 to FIG. 10 may be implemented by using software, hardware, firmware, or any combination thereof. When software is used to implement the embodiments, all or some of the embodiments may be implemented in a form of a computer program product.

The computer program product includes one or more computer instructions. When the computer program instructions are loaded and executed on a computer, all or some of the procedures or the functions according to the embodiments of this application are generated. The computer may be a general purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, division into units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected depending on actual requirements to achieve the objectives of the solutions in the embodiments.

In addition, function units in the embodiments of this application may be integrated into one processor, or each of the units may exist alone physically, or two or more units may be integrated into one unit. The integrated unit may be implemented in a form of hardware, or may be implemented in a form of a software function unit.

In the specification, claims, and the accompanying drawings of this application, the terms "first", "second", and the like are intended to distinguish similar objects but do not necessarily indicate a specific order or sequence. It should be understood that the terms used in such a way are interchangeable in proper circumstances, and this is merely a discrimination manner for describing objects having a same attribute in embodiments of this application. In addition, terms "include", "have", and any other variations thereof are intended to cover a non-exclusive inclusion, so that a process, method, system, product, or device that includes a series of units is not limited to those units, but may include other units not expressly listed or inherent to such a process, method, product, or device.

Names of messages/frames/information, modules, units, or the like provided in the embodiments of this application are merely examples, and other names may be used provided that the messages/frames/information, modules, units, or the like have same functions.

The terms used in embodiments of this application are merely for the purpose of illustrating specific embodiments, and are not intended to limit the present invention. The terms "a", "the", and "this" of singular forms used in the embodiments and the appended claims of this application are also intended to include plural forms, unless otherwise specified in a context clearly. It should be further understood that, in the description of this application, "/" represents an "or" relationship between associated objects unless otherwise specified. For example, A/B may represent A or B. The term "and/or" in this application describes only an association relationship for describing associated objects and represents that three relationships may exist. For example, A and/or B may represent the following three cases: Only A exists, both A and B exist, and only B exists, where A and B may be singular or plural.

Depending on the context, for example, the term "if" used herein may be explained as "while" or "when" or "in response to determining" or "in response to detection". Similarly, depending on the context, phrases "if determining" or "if detecting (a stated condition or event)" may be explained as "when determining" or "in response to determining" or "when detecting (the stated condition or event)" or "in response to detecting (the stated condition or event)".

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A mapping relationship updating method, comprising:
   sequentially obtaining, by a first device, a first packet and a second packet that are sent by a second device;
   determining, by the first device, a first time difference between a time at which the first packet is received and a time at which the second packet is received; and
   if the first device determines that the first time difference is not within a preset range, updating, by the first device, a period-based mapping relationship, wherein the period-based mapping relationship comprises a mapping relationship between a first period label and a sending period, the first period label is an identifier carried in a packet sent by the second device to the first device, and the sending period is a period for the first device to forward the packet corresponding to the first period label to a third device;
   wherein the updating, by the first device, a period-based mapping relationship comprises:
   obtaining, by the first device, a receiving time of a third packet, a preset processing duration, and a second period label carried in the third packet, wherein the second period label is used to indicate a period for the second device to send the third packet; and
   updating, by the first device, the period-based mapping relationship based on the receiving time, the second period label, and the preset processing duration.

2. The method according to claim 1, wherein the sequentially obtaining, by a first device, a first packet and a second packet that are sent by a second device comprises:
   sequentially receiving, by the first device, at least two packets that are sent by the second device; and
   determining, by the first device, the first packet and the second packet from the at least two packets, wherein the first packet and the second packet each comprise a preset identifier.

3. The method according to claim 2, wherein the first packet comprises a first preset identifier, the second packet comprises a second preset identifier, a period for the second device to send the first packet is a first period, and a period for the second device to send the second packet is a second period; and
  the first preset identifier is used to indicate that the first packet is the 1st packet sent by the second device in the first period, and the second preset identifier is used to indicate that the second packet is the 1st packet sent by the second device in the second period; or
  the first preset identifier is used to indicate an offset between a time at which the second device sends the first packet and a start time of the first period, and the second preset identifier is used to indicate an offset between a time at which the second device sends the second packet and a start time of the second period.

4. The method according to claim 1, wherein the third packet is the second packet, or the third packet is a packet that is sent by the second device and that is received by the first device after the first device determines that the first time difference is not within the preset range.

5. The method according to claim 1, further comprising:
  after the updating a period-based mapping relationship, receiving, by the first device, a fourth packet sent by the second device;
  obtaining, by the first device, a third period label carried in the fourth packet; and
  forwarding, by the first device, the fourth packet to the third device based on the third period label and an updated period-based mapping relationship.

6. The method according to claim 5, wherein the forwarding, by the first device, the fourth packet to the third device based on the third period label and an updated period-based mapping relationship comprises:
  determining, by the first device based on the third period label and the updated period-based mapping relationship, a forwarding period for forwarding the fourth packet to the third device;
  replacing, by the first device, the third period label in the fourth packet with a fourth period label, wherein the forwarding period of the fourth packet corresponds to the fourth period label; and
  sending, by the first device in the forwarding period of the fourth packet, the fourth packet carrying the fourth period label to the third device.

7. The method according to claim 6, further comprising:
  if the first device determines that a fifth packet occupies the forwarding period of the fourth packet, interrupting, by the first device, transmission of the fifth packet after data of the fifth packet that is transmitted in the forwarding period of the fourth packet exceeds a preset length.

8. The method according to claim 1, further comprising:
  after the updating a period-based mapping relationship, if the first device receives a sixth packet, determining, by the first device, a second time difference between a receiving time of the sixth packet and a receiving time of the second packet, wherein the sixth packet is sent by the second device in any period after the period for sending the second packet; and
  determining, by the first device based on the second time difference, whether to update the period-based mapping relationship again.

9. A mapping relationship updating method, comprising:
  inserting, by a second device, a first preset identifier into first data to obtain a first packet;
  sending, by the second device, the first packet in a first period;
  inserting, by the second device, a second preset identifier into second data to obtain a second packet; and
  sending, by the second device, the second packet in a second period, so that a first device determines, based on the first packet and the second packet that are sequentially received, whether to update a period-based mapping relationship, wherein the period-based mapping relationship comprises a mapping relationship between a first period label and a forwarding period, the first period label is an identifier carried in a packet sent by the second device to the first device, and the forwarding period is a period for the first device to forward the packet corresponding to the first period label to a third device, wherein
  the first preset identifier is used to indicate that the first packet is the 1st packet sent by the second device in the first period, and the second preset identifier is used to indicate that the second packet is the 1st packet sent by the second device in the second period; or
  the first preset identifier is used to indicate an offset between a time at which the second device sends the first packet and a start time of the first period, and the second preset identifier is used to indicate an offset between a time at which the second device sends the second packet and a start time of the second period.

10. A network device, comprising:
  a transceiver, configured to sequentially obtain a first packet and a second packet that are sent by a second device; and
  a processor, configured to:
  determine a first time difference between a time at which the first packet is received and a time at which the second packet is received; and
  if the network device determines that the first time difference is not within a preset range, update a period-based mapping relationship, wherein the period-based mapping relationship comprises a mapping relationship between a first period label and a sending period, the first period label is an identifier carried in a packet sent by the second device to a first device, and the sending period is a period for the transceiver to forward the packet corresponding to the first period label to a third device, wherein the processor is configured to:
  obtain a receiving time of a third packet, a preset processing duration, and a second period label carried in the third packet, wherein the second period label is used to indicate a period for the second device to send the third packet; and
  update the period-based mapping relationship based on the receiving time, the second period label, and the preset processing duration.

11. The network device according to claim 10, wherein the transceiver is configured to sequentially receive at least two packets that are sent by the second device; and
  the processor is further configured to determine the first packet and the second packet from the at least two packets, wherein the first packet and the second packet each comprise a preset identifier.

12. The network device according to claim 11, wherein the first packet comprises a first preset identifier, the second packet comprises a second preset identifier, a period for the second device to send the first packet is a first period, and a period for the second device to send the second packet is a second period; and the first preset identifier is used to indicate that the first packet is the 1st packet sent by the second device in the first period, and the second preset identifier is used to indicate that the second packet is the 1st packet sent by the second device in the second period; or the first preset identifier is used to indicate an offset between a time at which the second device sends the first packet and a start time of the first period, and the second preset identifier is used to indicate an offset between a time at which the second device sends the second packet and a start time of the second period.

13. The network device according to claim 10, wherein the third packet is the second packet, or the third packet is a packet that is sent by the second device and that is received by the transceiver after the first device determines that the first time difference is not within the preset range.

14. The network device according to claim 10, wherein the transceiver is further configured to, after the processor updates the period-based mapping relationship, receive a fourth packet sent by the second device;

the processor is further configured to obtain a third period label carried in the fourth packet; and the transceiver is further configured to forward the fourth packet to the third device based on the third period label and an updated period-based mapping relationship.

15. The network device according to claim 14, wherein the processor is further configured to:

determine, based on the third period label and the updated period-based mapping relationship, a forwarding period for forwarding the fourth packet to the third device, and replace the third period label in the fourth packet with a fourth period label, wherein the forwarding period of the fourth packet corresponds to the fourth period label; and the transceiver is further configured to send, in the forwarding period of the fourth packet, the fourth packet carrying the fourth period label to the third device.

16. The network device according to claim 15, wherein the processor is further configured to: if it is determined that a fifth packet occupies the forwarding period of the fourth packet, interrupt transmission of the fifth packet after data of the fifth packet that is transmitted in the forwarding period of the fourth packet exceeds a preset length.

17. The network device according to claim 10, wherein the processor is further configured to:

after the first device updates the period-based mapping relationship, if the transceiver receives a sixth packet, determine a second time difference between a receiving time of the sixth packet and a receiving time of the second packet, wherein the sixth packet is sent by the second device in any period after the period for sending the second packet; and determine, based on the second time difference, whether to update the period-based mapping relationship again.

* * * * *